United States Patent

Miller et al.

[11] Patent Number: 6,063,269
[45] Date of Patent: May 16, 2000

[54] FILTRATION APPARATUS FOR A HYDRAULIC SYSTEM

[75] Inventors: Christopher O. Miller, East Peoria; Chandrasekar Ramamoorthy, Downers Grove, both of Ill.

[73] Assignee: Caterpillar Inc., Peoria, Ill.

[21] Appl. No.: 09/130,326

[22] Filed: Aug. 6, 1998

[51] Int. Cl.$^7$ .................................................. B01D 36/00
[52] U.S. Cl. .......................... 210/167; 210/171; 210/172; 210/196; 210/416.5; 210/428; 60/454
[58] Field of Search .................................. 210/168, 171, 210/194, 196, 416.1, 416.5, 167, 172, 428; 60/453, 454; 417/76

[56] References Cited

U.S. PATENT DOCUMENTS

| | | | |
|---|---|---|---|
| 2,746,250 | 5/1956 | Hawkins | 60/51 |
| 2,959,008 | 11/1960 | Caroli | 60/52 |
| 3,370,423 | 2/1968 | Vaughan | 60/52 |
| 3,429,123 | 2/1969 | Burroughs | 60/53 |
| 3,529,421 | 9/1970 | Neeley | 60/454 |
| 3,924,713 | 12/1975 | Bessiere | 188/296 |
| 3,945,208 | 3/1976 | O'Connor | 60/420 |
| 4,469,594 | 9/1984 | Poetter | 210/108 |
| 4,995,970 | 2/1991 | Ohsakai | 210/167 |
| 5,317,872 | 6/1994 | Ingvast | 60/453 |
| 5,395,519 | 3/1995 | Miller | 210/149 |

Primary Examiner—Matthew O. Savage
Attorney, Agent, or Firm—Haverstock, Garrett & Roberts; J. W. Burrows

[57] ABSTRACT

Apparatus for improving the efficiency of filtering fluid of a hydraulic system, including a venturi adapted for connection to a first fluid carrying conduit of the hydraulic system for receiving a flow of the fluid therefrom, the venturi having a restricted passage extending therethrough and an orifice communicating therewith, a diverter conduit connected in communication with the orifice and with a second fluid carrying conduit of the hydraulic system, the diverter conduit containing a restricted orifice therein, and the venturi having an outlet connected in fluid communication with a filter, wherein the flow of the fluid through the restricted passage of the venturi will generate a reduced pressure condition in the diverter conduit to divert at least some of the fluid in the second fluid carrying conduit of the hydraulic system into the diverter conduit so as to pass into the venturi and flow onto the filter, the reduced pressure condition being weak or strong in correspondence to the fluid flow through the venturi so as to regulate the diverted flow.

4 Claims, 1 Drawing Sheet

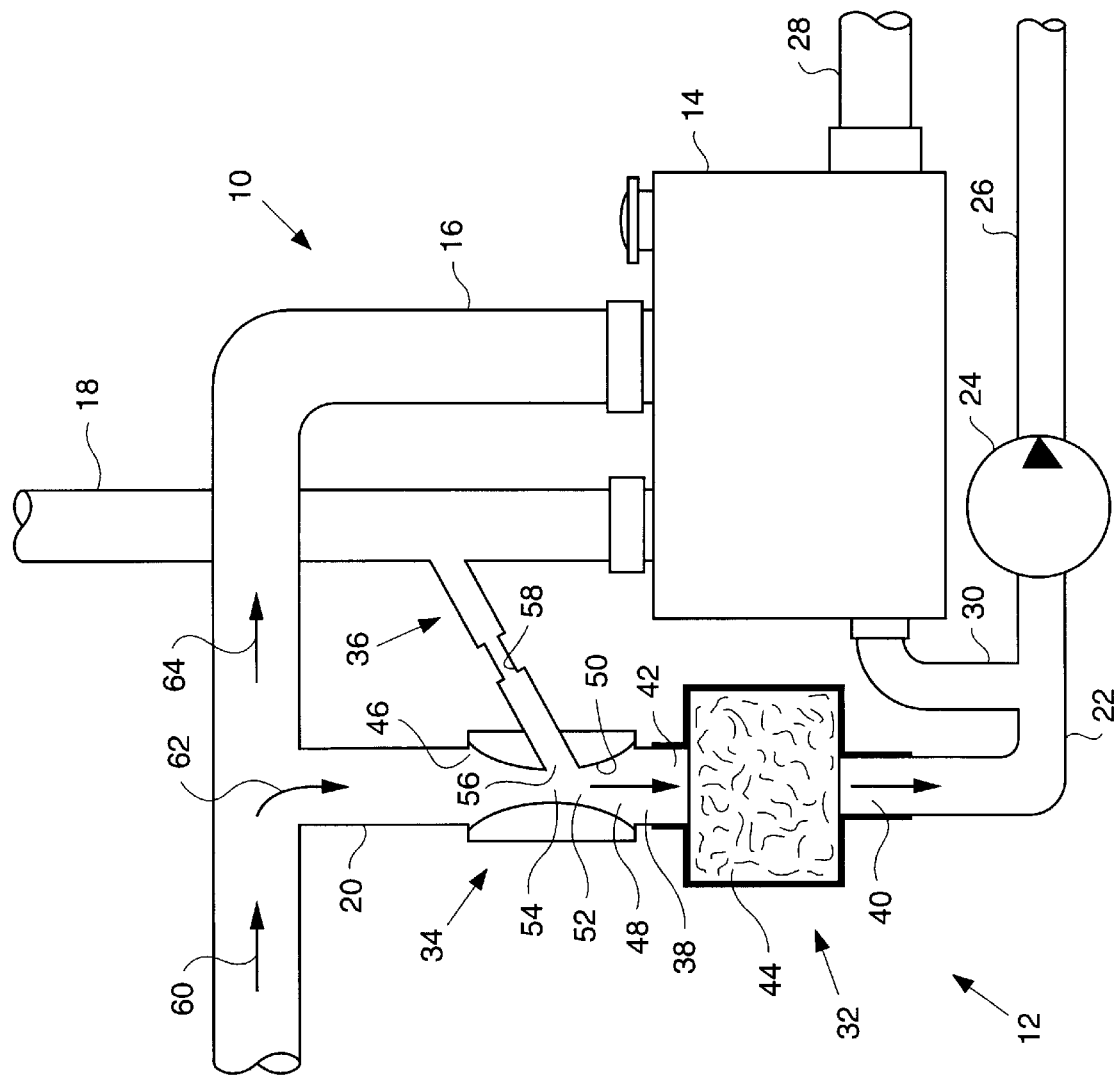

FILTRATION APPARATUS FOR A HYDRAULIC SYSTEM

TECHNICAL FIELD

This invention relates generally to fluid filtration devices for hydraulic systems and the like, and more particularly, to a filtration device operable in cooperation with a venturi for regulating fluid flow to the filtration device for more efficient operation thereof.

BACKGROUND ART

Filtration devices are used in hydraulic systems, including pilot circuits, return lines and case drain lines of hydraulic systems and the like, to minimize contamination of the hydraulic fluid and the system. However, the efficiency of known conventional filtration devices is relatively low under some conditions. Such low efficiency is generally due to several factors, including dynamic conditions such as flow surges, cold fluid conditions, vibration, and impact forces transmitted through the fluid to the filtration devices from the working end of the hydraulic system. One known way of increasing filtration efficiency is to maintain steady flow through the filter. See for instance, Miller U.S. Pat. No. 5,395,519, issued Mar. 7, 1995 to Caterpillar Inc. Another known way of increasing filtration efficiency is to not force cold hydraulic fluid through the filter. However neither of these alternatives has proven to be completely satisfactory.

Accordingly, the present invention is directed to overcoming one or more of the problems as set forth above.

DISCLOSURE OF THE INVENTION

In one embodiment of the present invention a filtration apparatus for improving the efficiency of filtering fluid of a hydraulic system is disclosed. The present filtration apparatus includes a filter and a venturi operable to divert additional fluid flow to the filter as existing flow therethrough is increased, such that the total fluid through the filter is maximized or near maximized under a wide range of conditions. The venturi has an inlet adapted for connection to a hydraulic system for receiving a flow of the fluid therefrom, an outlet, and a continuous sidewall extending between the inlet and the outlet forming a passage for the flow of the fluid through the venturi, the passage having a restricted portion located intermediate the inlet and the outlet, and the sidewall having an orifice therein communicating with the passage in the vicinity of the restricted portion thereof. The filter has an inlet, an outlet, and a passage for the flow of the fluid extending therebetween containing a filtration medium, the inlet of the filter being connected in communication with the outlet of the venturi for receiving the flow of the fluid therefrom, and the outlet of the filter being adapted for connection to the hydraulic system for passage of the flow of the fluid thereto. Additionally, the present apparatus includes a diverter conduit having a first end connected to the sidewall of the venturi in communication with the orifice therein, and a second end adapted for connection to the hydraulic systems in communication with a conduit having a second flow of the fluid therethrough. The diverter conduit contains a restricted orifice therein. In operation, the flow of the fluid through the restricted portion of the passage of the venturi operates to generate a reduced pressure condition in the orifice in the sidewall of the venturi and in the connected diverter conduit to divert at least some of the second flow of the fluid into the diverter conduit wherein the fluid will pass through the restricted orifice and into the passage of the venturi so as to flow through the filter, the restricted orifice operating to meter the flow of the fluid through the diverter conduit to the filter.

BRIEF DESCRIPTION OF THE DRAWINGS

The sole figure is a diagrammatic view of filtration apparatus according to the present invention for filtering fluid of a hydraulic circuit shown associated therewith.

BEST MODE FOR CARRYING OUT THE INVENTION

Referring now to the drawing, the sole figure shows the pertinent portions of a hydraulic circuit 10 including a filtration apparatus 12 constructed and operable according to the teachings of the present invention for providing efficient filtering of fluid of the hydraulic circuit under such operating conditions as flow surges, cold fluid conditions, vibration, and impact forces transmitted through the fluid to the filter from working portions of hydraulic circuit. The pertinent portion of hydraulic circuit 10 shown includes a receiver 14 for receiving and holding fluid of hydraulic circuit 10; a case drain line 16; a main return line 18; a filter supply line 20; a filter return line 22; a pilot pump 24; a pilot pump outlet line 26; a receiver outlet line 28; and a receiver to pilot pump supply line 30. Receiver 14 is a tank or reservoir of conventional construction adapted for receiving and holding fluid of hydraulic circuit 10 received from other portions (not shown) of hydraulic circuit 10 through case drain line 16 and main return line 18 which serve as the primary conduits for delivery of fluid to the receiver. Hydraulic circuit 10 is representative of a wide variety of hydraulic systems utilized, for instance, for operating working portions of machines such as tractors, excavators and the like, wherein the occurrence of contamination of the systems and the fluid by dust and other contaminants is anticipated. As will be explained, it is desirable to filter as much as reasonably possible of the fluid flow through case drain line 16 and main return line 18 to remove such contamination from the fluid and the hydraulic circuit.

Filtration system 12 includes a filter 32; a venturi 34; and a diverter line 36. Filter 32 is of generally conventional construction and includes an inlet 38, an outlet 40 and a passage 42 for the flow of fluid therethrough between inlet 38 and outlet 40, passage 42 containing a filtration medium 44. Venturi 34 includes an inlet 46, an outlet 48 and a continuous sidewall 50 extending therebetween forming a passage 52 therethrough for the flow of liquid, passage 52 including a restricted portion 54 intermediate inlet 46 and outlet 48. Sidewall 50 further includes an orifice 56 therein in communication with restricted portion 54 of passage 52. Inlet 46 of venturi 34 is connected in fluid communication with filter supply line 20 for receiving fluid therefrom, and outlet 48 of the venturi is connected in fluid communication with inlet 38 of filter 32, outlet 40 of filter 32 being connected in fluid communication with filter return line 22. Diverter line 36 is adapted for the passage of fluid therethrough and is connected on one end in fluid communication with orifice 56 in sidewall 50 of venturi 34, and on the other end with main return line 18. Diverter line 36 has a restricted orifice 58 therein for the flow of fluid therethrough located intermediate orifice 56 and main return line 18.

In operation, at least some portion of fluid flow in case drain line 16, represented by arrow 60, will flow through filter 32 via filter supply line 20, as shown by the arrow 62, and some of the flow may continue on via the case drain line into receiver 14, as shown by the arrow 64.

Fluid flow through filter supply line 20 will flow into passage 52 of venturi 34 through inlet 46 and pass through restricted portion 54, then exit the venturi through outlet 48 and enter filter 32. Importantly, the fluid flow through restricted portion 54 of venturi 34 will generate a reduced pressure condition in orifice 56 in sidewall 50, which reduced pressure condition will be communicated through diverter line 36 and restricted orifice 58 thereof to the main return line 18. Such reduced pressure condition will operate to divert some of the fluid flow through main return line 18 into diverter line 36, wherein the flow of the diverted fluid will be metered by restricted orifice 58 and exit diverter line 36 through orifice 56 into the flow of fluid through passage 52 of venturi 34. The diverted fluid flow will then flow with the fluid flow through filter supply line 20 into filter 32 through inlet 46 thereof. In filter 32, the fluid will pass through passage 42 and filtration medium 44 to remove contaminants from the fluid, then exit filter 32 through outlet 40. From filter 32 the fluid will then pass through filter return line 22, pilot pump 24 and pilot pump outlet line 26 enroute to another portion of hydraulic circuit 10 (not shown).

INDUSTRIAL APPLICABILITY

The present filtration apparatus 12 is contemplated for use with a wide variety of hydraulic systems and circuits such as the circuit 10 described above wherein a wide range of operating conditions are encountered such as wherein the hydraulic fluid, which can be an oil or other liquid substance conventionally used in hydraulic systems, is sometimes cold or otherwise more resistant to flow compared to during more ideal operating conditions. Under such conditions the fluid does not flow easily through filter 32, and fluid flow velocity through venturi 34 and restricted portion 54 thereof will be correspondingly lower. When flow velocity through restricted portion 54 is lower, the reduced pressure condition in orifice 56 and diverter line 36 will be correspondingly lower, that is, weaker with respect to the ability of the reduced pressure condition to divert flow in main return line 18 into diverter line 36. Under better flow conditions, that is, when the fluid flows more easily through filter 32, the velocity of the fluid flow through restricted portion 54 of venturi 34 will be higher, thereby generating a stronger reduced pressure condition in orifice 56 and diverter line 36, such that more fluid is diverted from main return line 18 through diverter line 36 and into passage 52 through venturi 34. Under these latter conditions, because the fluid flows easier, it will also flow more easily through restricted orifice 58, the net effect being greater flow through filter 32 and more efficient operation thereof.

Other aspects, objects and advantages of the present invention can be obtained from a study of the drawings, the disclosure and the appended claims.

What is claimed is:

1. A hydraulic system having an apparatus for filtering fluid therein, the hydraulic system comprising:

a reservoir;

first and second fluid carrying conduit connected to the reservoir;

a venturi having an inlet connected to the first fluid carrying conduit of the hydraulic system for receiving a flow of the fluid therefrom, an outlet, and a continuous sidewall extending between the inlet and outlet forming a passage for the flow of the fluid through the venturi, the passage having a restricted portion located intermediate the inlet and the outlet, and the sidewall having an orifice therein communicating with the passage in the vicinity of the restricted portion thereof;

a filter having an inlet, an outlet, and a passage for the flow of the fluid extending therebetween containing a filtration medium, the inlet of the filter being connected in communication with the outlet of the venturi for receiving the flow of the fluid therefrom, and the outlet of the filter being connected to the reservoir through a return conduit for passage of the flow of the fluid thereto; and a diverter conduit having a first end connected to the orifice in the sidewall of the venturi in communication with the restricted portion therein and a second end connected to the second fluid carrying conduit of the hydraulic system, the diverter conduit containing a restricted orifice therein, wherein the flow of the fluid through the restricted orifice portion of the passage of the venturi will generate a reduced pressure condition in the orifice in the sidewall of the venturi and in the diverter conduit operable to divert at least some of the fluid in the second fluid carrying conduit into the diverter conduit so as to pass therethrough and through the restricted orifice thereof into the passage of the venturi so as to flow through the filter and return to the hydraulic system, the restricted orifice operating to meter the flow of the fluid through the diverter conduit.

2. The hydraulic system, as set forth in claim 1, wherein the first fluid carrying conduit is connected in communication with a case of the hydraulic system.

3. The hydraulic system, as set forth in claim 1, wherein the return conduit of the hydraulic system is connected in communication with a pilot pump for passage of the flow of the fluid thereto.

4. The hydraulic system, as set forth in claim 1, wherein the second fluid carrying conduit of the hydraulic system comprises a main return conduit of the hydraulic system.

* * * * *